Nov. 10, 1931.  W. W. MOHR  1,831,187

MOUNTING MEANS FOR VALVE OPERATING MECHANISM

Filed July 7, 1930

INVENTOR
WALTER W. MOHR.

By Albert C. Bill

ATTORNEY

Patented Nov. 10, 1931

1,831,187

UNITED STATES PATENT OFFICE

WALTER W. MOHR, OF CHICAGO, ILLINOIS, ASSIGNOR TO THE EDWARD VALVE AND MANUFACTURING COMPANY, OF EAST CHICAGO, INDIANA, A CORPORATION OF ILLINOIS

MOUNTING MEANS FOR VALVE OPERATING MECHANISM

Application filed July 7, 1930. Serial No. 466,129.

My invention relates to an improved mounting means for valve operating mechanism of the impactor type, found desirable in operating large valves and particularly valves required to withstand high fluid pressures. With valves of the kind referred to, it is frequently impractical to develop sufficient pressure with a plain hand-wheel, to move the valve tightly to its closed position, or to open the valve. In such cases, either a long lever must be employed, or other operating means, for example, impactor mechanism, must be resorted to, which mechanism is capable of communicating large pressures resulting from inertia impacts, to the valve stem to move it either in a direction to tightly close the valve, or to open the valve as desired.

In connection with valve operating mechanisms of the impactor type, and particularly where the operating mechanism directly engages an externally threaded valve stem, difficulty has been experienced in the past in securing the impactor operating mechanism to the valve stem in such a manner that the connection between the valve stem and the associated part of the operating mechanism will not work loose, and that at the same time, the freely movable member of the impactor mechanism will be conveniently supported for operation.

The mounting means constituting my present invention comprise an improved means for mounting valve operating mechanism of the impactor type, shown and claimed in my Patent No. 1,731,314 granted to me on October 15, 1929.

By my present invention I provide an improved manner of mounting impactor mechanism upon a valve stem, so that the difficulties pointed out will be avoided.

Figure 1:
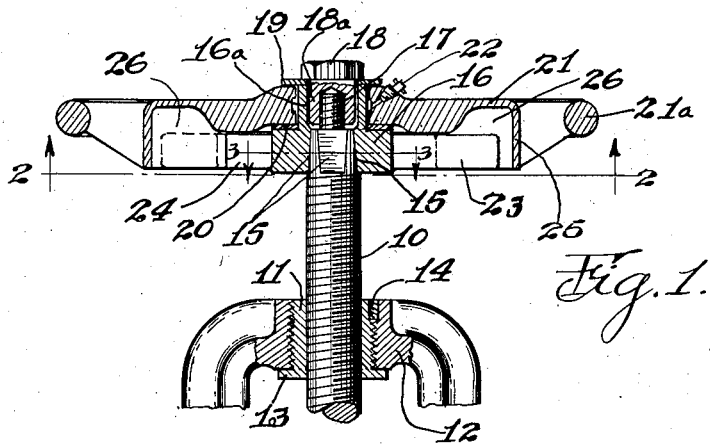
Figure 2:
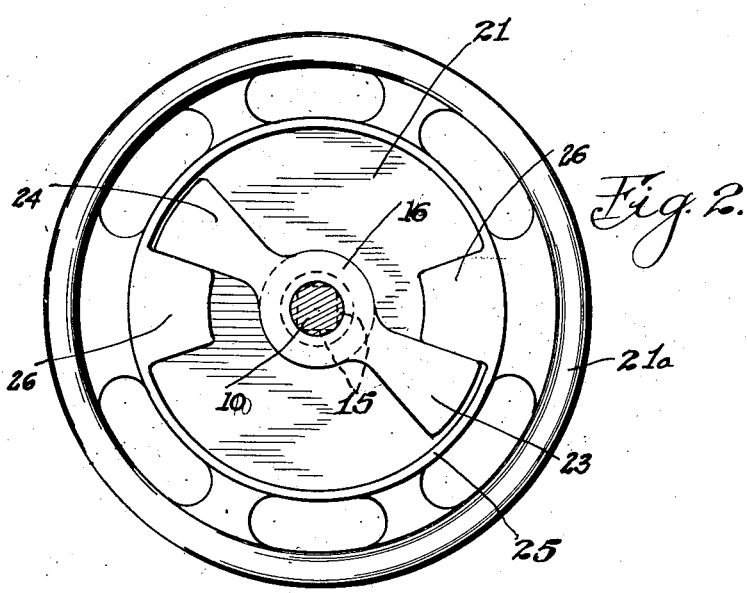
Figure 3:
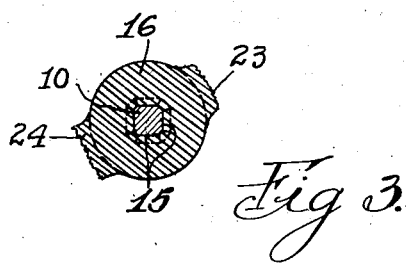

My invention will best be understood by reference to the accompanying drawings showing a preferred embodiment thereof, in which Fig. 1 is a vertical, central, sectional view through impactor mechanism mounted on a valve stem to be operated thereby, Fig. 2 is a sectional view of the parts shown in Fig. 1 taken along the line 2—2, and Fig. 3 is a sectional view through a part of the construction shown in Fig. 1 taken along the line 3—3.

Similar numerals refer to similar parts throughout the several views.

As shown in the drawings, an externally threaded valve stem is illustrated at 10, of the type having both angular and axial movement to move the valve to its closed and open positions. The stem 10 engages internal threads in a sleeve 11 which is externally threaded and engages corresponding threads in a yoke 12, said sleeve 11 being provided at its lower end with an outwardly extending flange 13 resting against the lower surface of the end portion of the yoke 12. Turning of the sleeve 11 in the yoke 12 from its position described, is prevented by a screw 14 engaging both the sleeve 11 and the yoke 12.

The upper end portion of the stem 10 is provided with a plurality of flattened faces 15, as more clearly shown in Fig. 3, which faces converge upwardly thus imparting to the stem 10 a tapered conformation. The faces 15 engage and fit similar surfaces formed in the bore of a hub 16, so that when the hub 16 is pressed firmly and downwardly upon the stem 10, turning movement of the hub on the stem is prevented. The end portion of the stem 10, above the faces 15, is of reduced diameter and threaded as shown at 17. The hub 16 is extended upwardly beyond the faces 15 a sufficient distance to contain a counterbore 16a. The threaded end portion 17 of the stem, has threaded thereon a headed cap-nut 18 having a cylindrical portion 18a which may nearly or quite fit the bore 16a, a washer 19 being located between the head of the cap-nut 18 and the upper end of the hub 16. As a result of the construction just described, when the cap-nut is tightly screwed in place, the hub 16 is held firmly in engagement with the faces 15 to prevent relative movement between the hub 16 and the valve stem 10.

The hub 16 is shouldered and of reduced diameter adjacent the counterbore 16a, said shouldered portion supporting a washer 20 upon which the hub of a hand-wheel 21 rests, the bore of said hub and its length, being such that the hand-wheel is free to move angularly upon the hub 16 between the washers 19 and 20, the washer 19 serving to prevent the removal of the hand-wheel from the hub 16. The hand-wheel 21 is preferably provided with a lubricating device 22 by which lubricant may be forced into the bore of the hand-wheel.

The hub 16 is provided with opposite radial arms 23 and 24, and the hand-wheel 21 is preferably provided with an imperforate web extending nearly to the ring 21a of the hand-wheel, and from the outer edge of the web, a depending flange 25 extends to enclose the arms 23 and 24. The flange 25 has extending inwardly therefrom, lugs 26, in the path of the ends of the arms 23 and 24, so that limited free movement of the hand-wheel is permitted in either direction relatively to the hub 16. As a result of the construction just described, when large forces are required to be exerted on the stem 10, in tightly closing the valve or moving the valve from its tightly closed position, the hand-wheel 21 may be moved quickly from one of its extreme positions to the other, relatively to the hub 16 and the impact of its momentum may be exerted upon the arms 23 and 24 and thus upon the hub 16 and through the faces 15 to the stem 10.

While I have shown my invention in the particular embodiment above described, it will be understood that I do not limit myself to this exact construction as I may employ equivalents known to the art at the time of the filing of this application without departing from the scope of the appeded claims.

What I claim is:

1. Mounting means for impactor mechanism for operating valves, consisting of the combination of a valve stem having a flattened and tapered end portion and a threaded end of smaller diameter than said tapered portion, a hub tightly fitting said tapered portion and having a counter-bore containing said threaded end, said hub having radial arms extending therefrom, a hand-wheel mounted for rotary movement on said hub and for impact engagement with said arms, a headed cap-nut on said threaded end, and a washer between the head on said nut and the end of said hub, said washer extending over said wheel, whereby said nut holds said tapered portion in engagement with said hub and also holds said wheel on said hub.

2. Mounting means for impactor mechanism for operating valves, consisting of the combination of a valve stem having a flattened and tapered end portion and a threaded end of smaller diameter than said tapered portion, a hub tightly fitting said tapered portion and having a counter-bore containing said threaded end, said hub having radial arms extending therefrom, a hand-wheel mounted for rotary movement on said hub and for impact engagement with said arms, and a headed cap-nut on said threaded end holding said tapered portion in engagement with said hub and holding said wheel on said hub.

3. Mounting means for impactor mechanism for operating valves, consisting of the combination of a valve stem having a threaded end, a hub rigidly engaging said stem adjacent said threaded end and having a bore containing said threaded end, a hand-wheel mounted for rotary movement on said hub and for impact engagement therewith limiting said rotary movement, and a headed cap-nut extending into said bore and engaging said threaded end, said nut holding said hub in engagement with said stem and holding said hand-wheel on said hub.

4. Mounting means for impactor mechanism for operating valves, consisting of the combination of a valve stem having a tapered end portion and a threaded end of smaller diameter than said tapered portion, a hub tightly fitting said tapered portion and having a counter-bore containing said threaded end, said hub having radial arms extending therefrom, a hand-wheel mounted for rotary movement on said hub and for impact engagement with said arms, and a headed cap-nut on said threaded end holding said tapered portion in engagement with said hub and holding said wheel on said hub.

5. Mounting means for impactor mechanism for operating valves, consisting of the combination of a valve stem having a threaded end, a hub having relatively immovable engagement with said stem adjacent said threaded end, a headed cap-nut containing said threaded end and extending into said hub, and impactor mechanism carried by said hub, said nut holding said stem in engagement with said hub and holding said impactor mechanism on said hub.

6. Mounting means for impactor mechanism for operating valves, consisting of the combination of a valve stem having a threaded end, a hub having tapered engagement with said stem adjacent said threaded end, a headed cap-nut containing said threaded end and extending into said hub, and impactor mechanism carried by said hub, said nut holding said stem in engagement with said hub and holding said impactor mechanism on said hub.

7. Mounting means for impactor mechanism for operating valves, consisting of the combination of a valve stem having a threaded end, a hub having flat sided and tapered engagement with said stem adjacent said threaded end, a headed cap-nut containing said threaded end and extending into said hub, and impactor mechanism carried by said hub, said nut holding said stem in engagement with said hub and holding said impactor mechanism on said hub.

In witness whereof, I hereunto subscribe my name this 23rd day of June, A. D. 1930.

WALTER W. MOHR.